United States Patent
Kelly et al.

(10) Patent No.: US 8,707,444 B2
(45) Date of Patent: Apr. 22, 2014

(54) SYSTEMS AND METHODS FOR IMPLEMENTING APPLICATION CONTROL SECURITY

(75) Inventors: Ciaran Kelly, Carnmore (IE); Iarla Molloy, Craughwell (IE)

(73) Assignee: Lumension Security, Inc., Scottsdale, AZ (US)

( * ) Notice: Subject to any disclaimer, the term of this patent is extended or adjusted under 35 U.S.C. 154(b) by 0 days.

(21) Appl. No.: 13/269,040

(22) Filed: Oct. 7, 2011

(65) Prior Publication Data

US 2012/0090033 A1    Apr. 12, 2012

Related U.S. Application Data (60) Provisional application No. 61/392,022, filed on Oct. 11, 2010.

(51) Int. Cl.
G06F 7/04      (2006.01)
G06F 21/51     (2013.01)
G06F 21/34     (2013.01)
G06F 21/62     (2013.01)

(52) U.S. Cl.
CPC ............... *G06F 21/51* (2013.01); *G06F 21/34* (2013.01); *G06F 21/6218* (2013.01); *G06F 2221/2153* (2013.01)
USPC ............................................................ 726/26

(58) Field of Classification Search
CPC ..... G05F 21/34; G05F 21/51; G05F 21/6218; G05F 2221/2153
USPC ................... 726/26, 5, 35; 713/168, 187, 189
See application file for complete search history.

(56) References Cited

U.S. PATENT DOCUMENTS

| | | | |
|---|---|---|---|
| 6,990,660 B2 | 1/2006 | Moshir et al. | 717/171 |
| 7,278,158 B2 | 10/2007 | Peretti | 726/21 |
| 7,487,495 B2 | 2/2009 | Usov | 717/139 |
| 7,849,514 B2 | 12/2010 | Usov et al. | 726/28 |
| 8,015,606 B1 * | 9/2011 | Jevans et al. | 726/22 |
| 8,060,924 B2 | 11/2011 | Usov | 726/10 |
| 2003/0014667 A1 | 1/2003 | Kolichtchak | 713/201 |
| 2006/0150256 A1 * | 7/2006 | Fanton et al. | 726/27 |
| 2007/0143827 A1 * | 6/2007 | Nicodemus et al. | 726/2 |
| 2008/0107274 A1 * | 5/2008 | Worthy | 380/278 |
| 2009/0210267 A1 | 8/2009 | Fish et al. | 705/7.28 |
| 2009/0241170 A1 * | 9/2009 | Kumar et al. | 726/3 |
| 2010/0082987 A1 * | 4/2010 | Thom et al. | 713/171 |
| 2011/0299679 A1 * | 12/2011 | Yamaguchi et al. | 380/44 |
| 2012/0036220 A1 * | 2/2012 | Dare et al. | 709/217 |

FOREIGN PATENT DOCUMENTS

WO    WO 2006101549 A2 *    9/2006

OTHER PUBLICATIONS

"Handshaking—Wikipedia, the free encyclopedia," retrieved from the Internet on Aug. 26, 2010 at http://en.wikipedia.org/wiki/Handshaking.

* cited by examiner

*Primary Examiner* — Samson Lemma
(74) *Attorney, Agent, or Firm* — Greenberg Traurig, LLP (57) ABSTRACT

Systems and methods for implementing application control security are disclosed. In one embodiment, a system includes a first device, a decrypted white-list, and an executable program. The first device may be in electrical communication with a memory containing an encrypted white-list. The encrypted white-list may be decrypted using an identifier of a second device. The executable program may be referenced in the decrypted white-list.

17 Claims, 6 Drawing Sheets

SYSTEMS AND METHODS FOR IMPLEMENTING APPLICATION CONTROL SECURITY

CROSS-REFERENCE TO RELATED APPLICATION

This application claims priority to U.S. Patent Application No. 61/392,022, filed Oct. 11, 2010, entitled "SYSTEMS AND METHODS FOR IMPLEMENTING APPLICATION CONTROL SECURITY," which is incorporated herein by reference in its entirety.

BACKGROUND

Application white-lists contain programs that are authorized to run on electronic systems or components of electronic systems, e.g., a computer. Generally, application white-lists are implemented using a repository of hashes to ensure that a given program on the white-list is authorized to be executed. For example, when a user employs a program on a computer, a hash function verifies that the program is listed in the application white-list as a program authorized to be executed.

SUMMARY OF THE DISCLOSURE

Broadly, the present disclosure relates to systems, methods, and apparatus for implementing application control security. The systems, methods, and apparatus disclosed herein, may be useful to mitigate theft of data (e.g., from a device). In one aspect, a system includes a first device, a decrypted white-list, and an executable program. The first device is in electrical communication with a memory containing an encrypted white-list. Executable programs and/or files may be referenced in the encrypted white-list. The executable programs and/or files may be inaccessible to unauthorized users when referenced in the encrypted white-list. In order for the executable programs and/or files to be accessed, the executable programs and/or files may be referenced in the decrypted white-list. In this regard, the encrypted white-list is decrypted using an identifier of a second device. The identifier contains information suitable to identify the second device and may be required to decrypt the encrypted white-list. Thus, if the first device, e.g., a laptop, gets stolen without the second device, i.e., the identifier of the second device is not available to decrypt the encrypted white-list, all executable programs and/or files referenced in the encrypted white-list will be inaccessible to the thief. This results in mitigation of data loss due to theft.

In one approach, the identifier is in the form of an electromagnetic radiation signal. For example, the identifier of the second device may be transmitted to the first device via electromagnetic radiation. In one embodiment, the electromagnetic radiation signal has a signal strength. In another approach, the identifier is in the form of an electrical signal. For example, the second device may be electrically connected to the first device such that the identifier is transmitted via an electrical connection between the first device and second device. In one approach, the encrypted white-list is decrypted using an identifier of a third device. In one embodiment, the identifier is received at the first device from a biometric reader. In on embodiment, the identifier of the second device and the identifier of the third device are combined to create a composite identifier. In one approach, the encrypted white-list has at least two partitions. For example, a first partition may have executable programs with a first level of security and a second partition may have executable programs with a second level of security. In another example, the first partition may be decrypted using an identifier that is different than the identifier used to decrypt the second partition.

Methods for implementing application control security are provided. In one embodiment, a method may comprise receiving at a first device an identifier of a second device, where the first device is operable to read an encrypted white-list, receiving the encrypted white-list, producing a decrypted white-list, determining whether an executable program is referenced in the decrypted white-list, and based on the determining step, allowing or disallowing execution of the executable program. In one embodiment, the producing step comprises decrypting the encrypted white-list using the identifier of the second device.

In one embodiment, the first device and the second device may have access to a network and the method may further comprise transmitting a request onto the network. In one embodiment, the method may further comprise performing the receiving at a first device an identifier of a second device step in response to the transmitting step. In one embodiment, the request is an address resolution protocol. In one embodiment, the receiving at a first device an identifier of a second device step may comprise receiving the identifier in the form of an electromagnetic radiation signal. In one embodiment, the electromagnetic radiation signal has a signal strength. In one embodiment, the method may further comprise determining whether the signal strength is above a predetermined threshold. In one embodiment, the method may further comprise receiving an indication that the signal strength is no longer above the predetermined threshold, and based on the receiving an indication step, deleting the decrypted white-list.

In one embodiment, the method may further comprise disallowing, prior to the receiving at a first device an identifier of a second device step, execution of the executable program on the first device. In one embodiment, the method may further comprise creating a white-list associated with the second device, receiving the identifier of the second device, encrypting the white-list via the identifier of the second device, and storing the encrypted white-list in the memory. In one embodiment, the method may further comprise transmitting, prior to the receiving at a first device an identifier of a second device step, an identifier of the first device to the second device. In one embodiment, the receiving at a first device an identifier of a second device step may comprise receiving the identifier in the form of an electrical signal. In one embodiment, the identifier is received from a biometric reader.

In one embodiment, the method may further comprise partitioning the encrypted white-list into at least two partitions, and decrypting at least one partition of the encrypted white-list using the identifier of the second device. In one embodiment, the first device receives the encrypted white-list from a memory in electrical communication with the first device. In one embodiment, deleting the encrypted white-list comprises deleting the encrypted white-list from the memory.

In one embodiment, a method comprises receiving at a first device an identifier of a second device and an identifier of a third device, where the first device is operable to read an encrypted white-list, receiving the encrypted white-list, creating a composite identifier using the identifier of the second device and the identifier of the third device, producing a decrypted white-list, determining whether an executable program is referenced in the decrypted white-list, and based on the determining step, allowing or disallowing execution of the executable program. In one embodiment, the producing step may comprise decrypting the encrypted white-list using the composite identifier.

Various ones of the unique aspects, approaches, and embodiments noted herein above may be combined to yield various systems, methods, and apparatus configured to implement application control security. Furthermore, the above-described systems may be utilized in conjunction with the above-described methods, and vice-versa, as appropriate, to achieve various inventive systems, methods, and apparatus for implementing application control security.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

DETAILED DESCRIPTION

Reference will now be made in detail to the accompanying drawings, which at least assist in illustrating various pertinent embodiments of the new technology provided for by the present disclosure.

Figure 1:
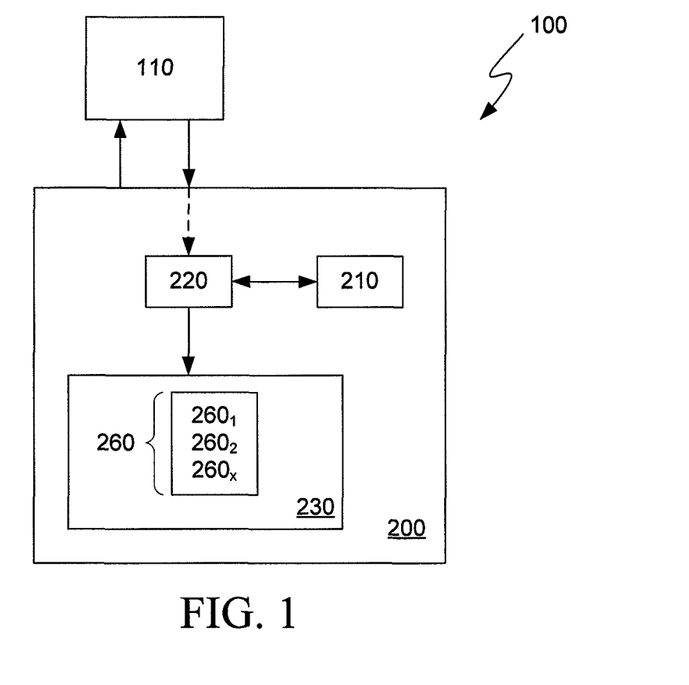
FIG. 1 is a schematic view of one embodiment of a system useful in accordance with the present disclosure.

Broadly, the present application relates to systems and methods for implementing application control security. One embodiment of a system useful for implementing application control security is illustrated in FIG. 1. In the illustrated embodiment, the system 100 includes a server 110 and an executing device 200. The executing device 200 may be useful for running executable programs 260. The executing device 200 includes a local store 210, a request handler 220, and a white-list 230. In one embodiment, the server 110 may be in communication (e.g., electrical communication, such as wired or wireless communication) with the executing device 200, such as one or more of a computer, server, mobile phone, and personal digital assistant (PDA), to name a few. In one embodiment, the server 110 may be in communication with the request handler 220. A request message to build the white-list 230 may be sent by an administrator (not illustrated) from the server 110 to the request handler 220. In one embodiment, the request handler 220 saves the white-list 230 configuration in the local store 210. In one embodiment, the process of building the white-list 230 includes registering a list of executable programs 260 in the white-list 230.

A white-list is a list located in memory of a computer and that contains a list of executable programs, e.g., software applications that are authorized to run on a device. Generally, application white-lists are implemented using a repository of cryptographic hashes to ensure that a given program on the white-list is authorized to be executed. For example, when a user employs a program on a computer, a cryptographic hash function verifies that the program is listed in the application white-list as a program authorized to be executed. When users and/or computers are in white-list-only mode, any unauthorized executable is prevented from loading and executing. White-list-only mode prevents all unauthorized executables from loading and being executed.

Figure 2:
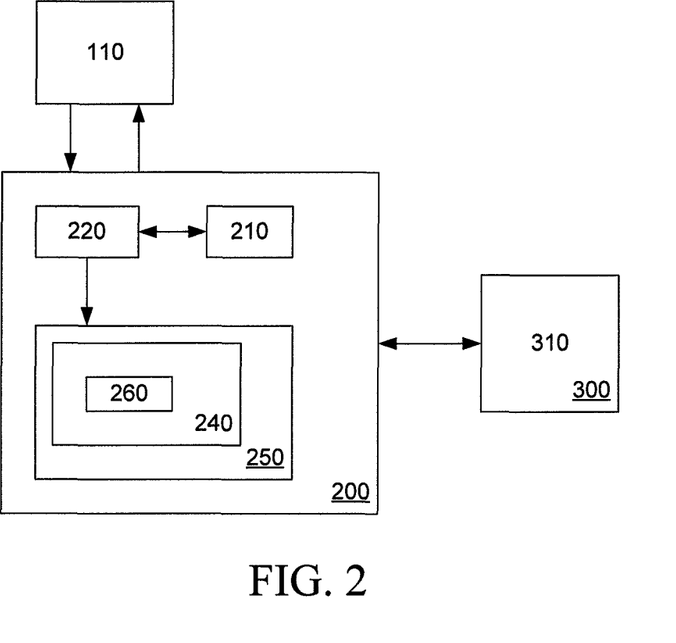
FIG. 2 is a schematic view of one embodiment of a system useful in accordance with the present disclosure.

In one embodiment, and with reference now to FIG. 2, the executing device 200 includes memory 250, which may contain an encrypted white-list 240. The encrypted white-list 240 may be encrypted using all or part of an identifier 310 of an application control device 300. For example, hash information of the encrypted white-list 240 may be transformed with the identifier 310 of the application control device 300 to make the encrypted white-list 240 inaccessible to non-authorized users. Using the identifier 310 of the application control device 300 to encrypt the white-list 240 may mitigate theft of data.

A device is an electrical system and/or a component of an electronic system. For example, a device may be a computer, server, mobile phone, personal digital assistant (PDA), cordless communicator, e.g., a Bluetooth device, a wireless service point, a biometric reader, a dongle, or an authorized user's badge, to name a few. In one embodiment, the memory 250 containing the encrypted white-list 240 may be in electrical communication with the executing device 200.

As described further herein, the executing device 200 includes a memory 250 that contains an encrypted white-list 240. Memory is a component of an electronic system used to store information (e.g., on a temporary or permanent basis). For example, memory may include read-only memory (ROM) (e.g., PROM, EPROM, EEPROM, EAROM, Flash memory) or read-write memory (e.g., random access memory, hard disk drive, solid state drive), to name a few. In one embodiment, the memory 250 containing the encrypted white-list 240 may be located on any device, e.g., a device different than the executing device 200. In one embodiment, the memory 250 containing the encrypted white-list 240 may be separate from and in electrical communication with the executable device 200.

In one embodiment, the white-list (e.g., encrypted or decrypted) is stored in a computer memory and accessed via electrical communication. In another embodiment, the white-list (e.g., encrypted or decrypted) is stored in other types of data storage such as on optical disc, magnetic tape and accessed or read via another machine readable format. For example, the white-list could be in the form of a 2D barcode which is optically scanned or read. In one embodiment, when whatever data storage medium or mechanism for obtaining the white-list is invoked, the executing device 200 is operable to read and/or receive the white-list.

As shown in FIG. 1, the white-list 230 contains a list of executable programs 260. Before an executable program, e.g., $260_1$, can be executed by the executing device 200 in white-list-only mode, the white-list is reviewed and permission must be granted. In one embodiment, an administrator of the executing device 200 may grant permission to allow the executable program $260_1$ to be executed. In one embodiment, before permission can be granted to execute the executable program $260_1$, the encrypted white-list 240 may be decrypted. In one embodiment, and with reference now to FIG. 2, the encrypted white-list 240 may be decrypted using the identifier 310 of the application control device 300. An identifier is any information suitable to identify (e.g., uniquely identify) a device. For example, the identifier 310 may be a network identifier, the name of the device, an ID of the device, or RFID, to name a few.

In one embodiment, the application control device 300 may be mobile. For example, the application control device 300 may be capable of moving readily. In one embodiment, a mobile application control device 300 may include at least one of a cell phone, a device supporting the Bluetooth protocol, and an ID badge, to name a few. In one embodiment, the identifier 310 of the application control device 300 may be transmitted to an executing device 200 by the application control device 300 during normal operation of the application control device 300. In this example, the executing device 200 may receive the identifier 310 during normal operation of the executing device 200. In one embodiment, the application control device 300 may receive a signal, e.g., a radio frequency signal, to trigger, induce, and/or provoke transmission of the identifier 310 to the executing device 200. For example, if the executing device 200 is a computer including a card reader module and the application control device 300 is an ID badge, the card reader module may transmit a signal to the ID badge to trigger, induce, and/or provoke transmission of the identifier 310 of the ID badge (e.g., an RFID badge).

In one embodiment, the application control device 300 may be in a fixed location. For example, the application control device 300 may be a wireless LAN. In one embodiment, the identifier 310 may be an SSID of a wireless LAN. In this example, the SSID is transmitted to the executing device 200, e.g., a laptop.

In one embodiment, the application control device 300 may be physically connected to the executing device 200. For example, the application control device 300 may be a flash drive or a dongle, to name a few. In one embodiment, the identifier 310 of the application control device 300 may be a software file. In one embodiment, the identifier 310 of the application control device 300 may be a number programmed into memory of the application control device 300. In one embodiment, the software file and/or the number programmed into memory may be created and/or programmed by the owner of the application control device 300 and may be any identifier 310 the owner chooses.

In one embodiment, the application control device 300 may be part of the executable device 200. For example, the application control device 300 may be a biometric reader. In one embodiment, the biometric reader may be located in the executable device 200. In one embodiment, the identifier 310 of the application control device 300 may be an electrical signal converted from a finger print of an authorized user.

In one embodiment, the identifier 310 may be in the form of an electromagnetic radiation signal. For example, the application control device 300 may be a Bluetooth device, and the executing device 200 may be a phone, smartphone, or PDA. In this example, the identifier 310 is transmitted via electromagnetic radiation from the application control device 300 to the executing device 200. In one embodiment, the electromagnetic radiation signal may have a signal strength. In one embodiment, the identifier 310 may be a MAC address of the application control device 300. In this example, the identifier 310 may be received at the executing device 200 due to the executing device 200 polling the application control device 300 for the MAC address.

In one embodiment, the identifier 310 is in the form of an electrical signal. In one example, an application control device 300 may be electrically connected to the executing device 200. In this example, the identifier 310 may be a programmable software key that is transmitted via an electrical connection from the application control device 300 to the executing device 200. For example, a flash drive and/or a dongle may be physically connected to the executing device 200 and may contain a programmable software key that is read by the executing device 200 and used to decrypt the encrypted white-list 240. In another example, the application control device 300 may be a biometric reader electrically connected to the executing device 200. In this example, the identifier 310 may be an electrical signal converted from a finger print of an authorized user. In one embodiment, the finger print of the authorized user may be converted to an electrical signal every 15 minutes. In one embodiment, an authorized user may be required to apply their finger to the biometric reader every 15 minutes in order to decrypt the encrypted white-list 240.

Figure 3:
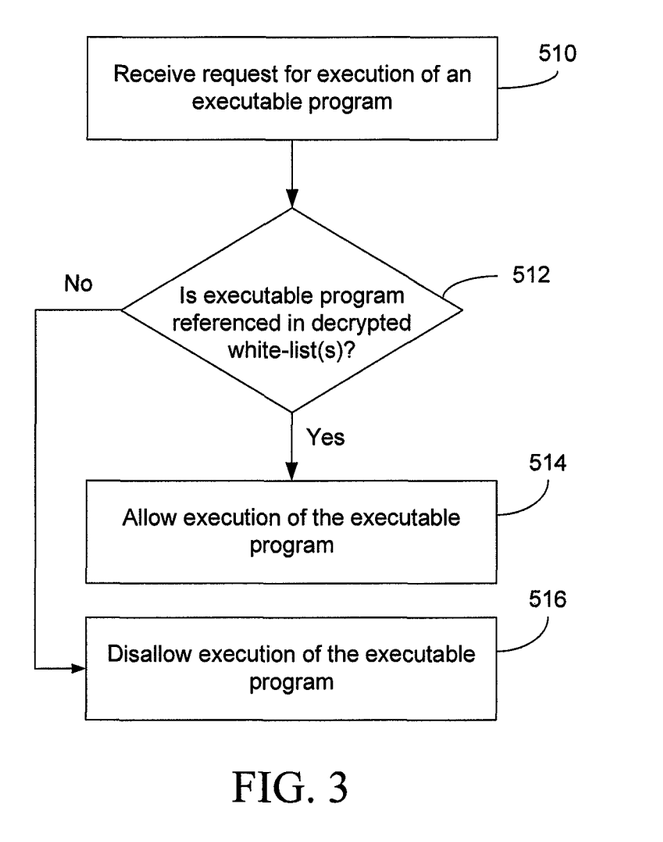
FIG. 3 is a flow chart of one embodiment of methods useful for implementing application control security.

FIG. 3 shows a flowchart of a method for providing application control security. In one embodiment, the method includes receiving a request for execution of an executable program in step 510. Before the executable program can be executed, the decrypted white-list is checked to see if the executable program is referenced therein in step 512. If the executable program is referenced in the decrypted white-list, execution of the executable program is allowed in step 514. If the executable program is not referenced in the decrypted white-list, execution of the executable program is not allowed in step 516.

After the encrypted white-list is decrypted, the decrypted white-list may be restricted by a time to live (TTL) so that the white-list remains decrypted, for example, for only one TTL period. For example, after the encrypted white-list is decrypted, it may stay in cache for the TTL. In one embodiment, as described further herein, once the TTL expires, the executing device may delete the decrypted white-list and require the identifier to be received again. In one embodiment, the TTL is a configurable value. For example, the TTL may be downloaded to the executing device from the server.

Figure 4:
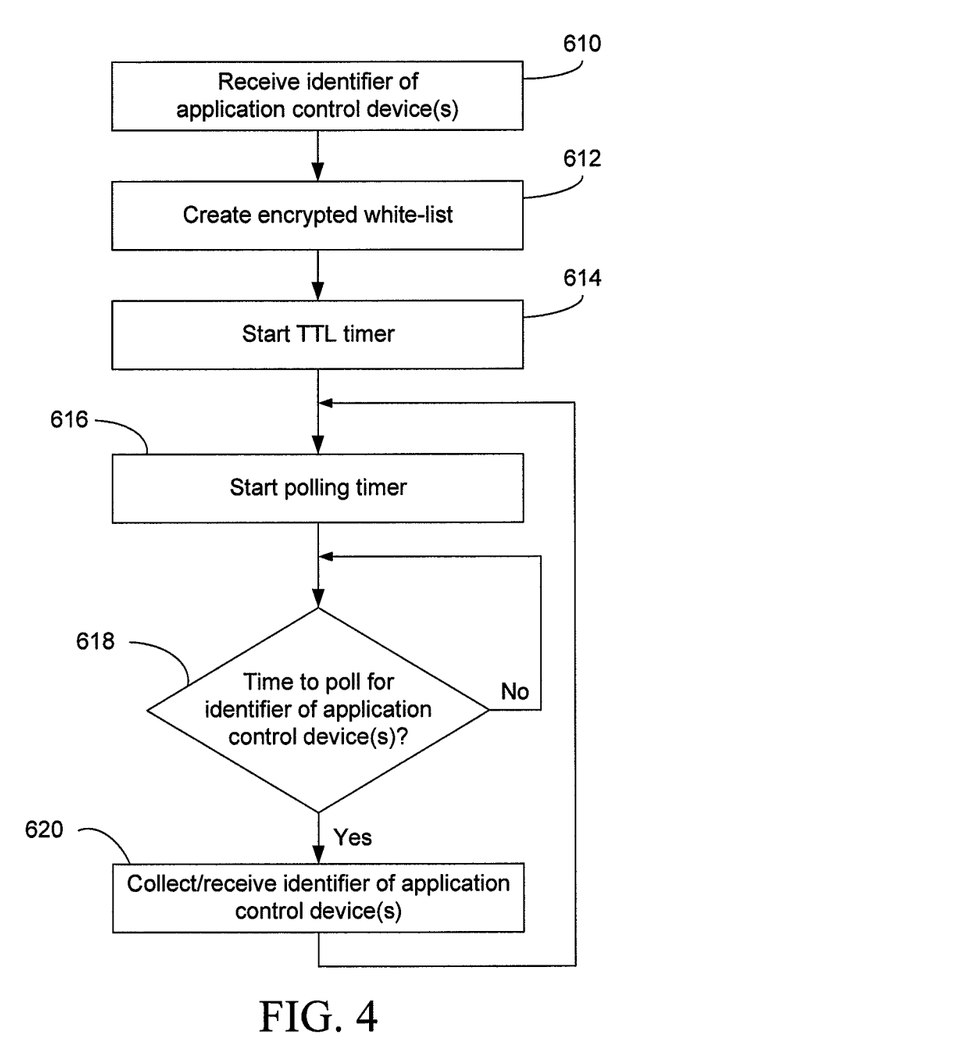
FIG. 4 is a flow chart of one embodiment of methods useful for handling encrypted and decrypted white-lists.

FIG. 4 is a flow chart of one embodiment of methods useful for handling encrypted and decrypted white-lists. In one embodiment, the method includes receiving the identifier of the application control device in step 610. The identifier of the application control device, or a portion thereof, as described further herein, is used to create the encrypted white-list in step 612. In one embodiment, steps 610 and 612 may be performed by the executing device. For example, the executing device may be operated by a user with permission to control application white-lists (e.g., an administrator) while an identifier of an application control device is received by the executing device in step 610 (e.g., via placing a cordless application control device in proximity to the executing device) and a white-list is encrypted using the identifier in step 612 (e.g., by direction of the administrator). In another embodiment, steps 610 and 612 may be performed by a server or device separated from the executing device. For example, a user with permission to control application white-lists may operate a server or other device separated from the executing device to receive an identifier of an application control device in step 610 and to create an encrypted white-list using the identifier in step 612.

In some embodiments, the identifier may be received in step 610 at a device different from a device on which the encrypted white-list is created. In one embodiment, the identifier is received in step 610 by the executing device (e.g., in administrator mode) and is transmitted to a server for the server to encrypt a white-list in step 612. For example, the executing device may be operated to initially collect an identifier of the application control device and the server may maintain a repository of encrypted white-lists to serve to executing devices. In another embodiment, the identifier of the application control device is received in step 610 at a server and passed to the executing device. For example, the identifier may subsequently be downloaded from the server to the executing device to be used in encrypting a white-list in step 612 on the executing device, such as when the executing device is in an administrator mode. The executing device may read the identifier of the application control device from the server and create an encrypted white-list.

In one embodiment, after the encrypted white-list is created in step 612, the encrypted white-list may be restricted by a time to live (TTL). In one embodiment, the method uses a TTL timer to determine the TTL of a decrypted white-list stored in a cache. The TTL timer is initialized in step 614. In one embodiment, the TTL timer is configured by a server and downloaded by the executing device. For example, the TTL timers of multiple executing devices may be controlled by a central device separate from the executing device.

In one embodiment, the method uses a polling timer to determine an interval by which to request, poll, scan, and/or survey identifiers of application control devices that are available to the executing device. In one embodiment, the duration of the polling timer is configured at the server and downloaded to the executing device. After the polling timer is initialized with an initial duration in step 616, the method includes checking if it is time to poll for the identifier of the application control device in step 618. If it is not time to poll for the identifier of the application control device, step 618 is repeated until it is time to poll for the identifier of the application control device. If it is time to poll for the identifier of the application control device, the executing device may collect and/or receive at least one identifier of at least one application control device in step 620. For example, when it is time to poll for the identifier of the application control device, the executing device may check for the presence of the correct identifier to ensure that an authorized user is still near. For example, if the application control device is a mobile phone of an authorized user, the executing device will check to see if it has received the identifier of the mobile phone (e.g., an identifier of the mobile phone that is part of a Bluetooth network). If the identifier of the mobile phone is received, the white-list remains decrypted. In another example, if the application control device is an authorized user's ID badge, the executing device will transmit a signal to trigger, induce, and/or provoke transmission of the identifier of the authorized user's ID badge. If the identifier of the authorized user's ID badge is received, the white-list will remain decrypted.

In one embodiment, one identifier of one application control device is collected in step 620. In some embodiments, at least two identifiers of at least two application control devices are collected, or at least three identifiers of at least three application control devices are collected, or at least four identifiers of at least four application control devices are collected, or at least five identifiers of at least five application control devices are collected.

After at least one identifier is collected in step 620, the encrypted white-list is attempted to be decrypted using the at least one identifier collected and the decryption results are stored into cache. In one embodiment, the decryption results are filtered, checked and/or analyzed to confirm that only correct decryptions are stored. For example, encrypted white-lists that yield improper or non-functioning results (e.g., decrypted white-lists) after decryption may not be stored. In another embodiment, all decryption results from collected identifiers and encrypted white-lists are stored (e.g., including results from attempted decryptions using an incorrect application control device identifier). For example, a cache may store incorrect results that, when the cached results are reviewed in response to a request to execute an executable (e.g., in an attempt to run the executing device in white-list-only mode), the executing device will not allow the executable to execute. In one embodiment, if the correct identifier is not collected in step 620, then the encrypted white-list is not decrypted. As described further herein, the results of the decryption may be checked to see if the decryption succeeded (e.g., in a usable decrypted white-list).

In one embodiment, if a correct identifier is collected, the TTL timer is step 614 is reset to its initial value. In one embodiment, if a correct identifier is collected, the polling timer is reset to its initial value. In one embodiment, the TTL timer is periodically checked to see if the timer has expired. If the TTL timer has expired, the decrypted white-list may be deleted (e.g., from a cache where white-lists are checked).

Figure 5:
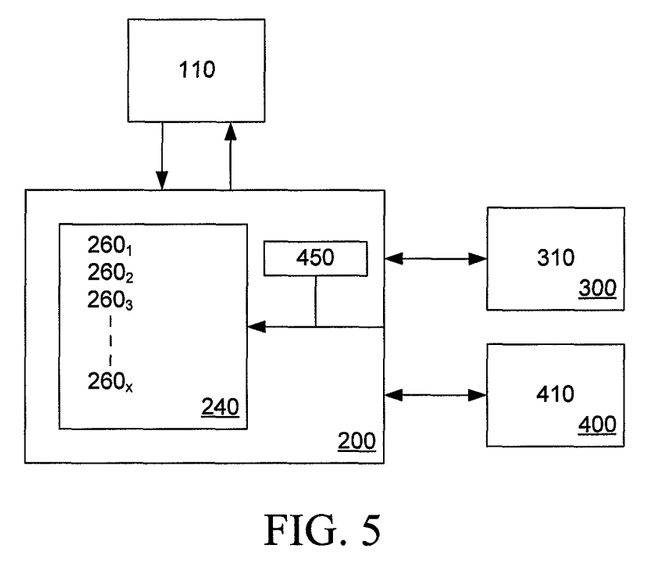
FIG. 5 is a schematic view of one embodiment of a system useful for handling white-lists in accordance with the present disclosure.

FIG. 5 is a schematic view of one embodiment of a system useful for handling white-lists in accordance with the present disclosure. In one embodiment, the identifier 310 of the application control device 300 may be transmitted to the executing device 200. For example, if the application control device 300 is a wireless LAN transmitter and the executing device 200 is a laptop, the wireless LAN may include an SSID received by the laptop. In one embodiment, a transmitter of the wireless LAN (e.g., wireless access point) may transmit an SSID in the range of about from 50 meters to about 100 meters. For example, if the laptop is 70 meters from the wireless LAN, the laptop may receive the SSID. In another example, if the laptop is 130 meters from the wireless LAN, the laptop may not receive the SSID.

In one embodiment, the executing device 200 may poll the application control device 300 for the identifier 310. In one embodiment, the executing device 200 may poll the application control device 300, at the polling time, for the identifier 310 at least once a second. In some embodiments, the executing device 200 may poll the application control device 300 for the identifier 310 at least once every five seconds, or at least once every 10 seconds, or at least once every minute, or at least once every 10 minutes, or at least once every hour. For example, if the application control device 300 is a Bluetooth device and the executing device 200 is a mobile smartphone, the smartphone may poll the Bluetooth device for the identifier 310 at least once every minute.

In one embodiment, the encrypted white-list 240 may be partitioned. In one embodiment, the encrypted white-list 240 has at least two partitions. For example, a first partition of the encrypted white-list 240 may have executable programs 260 with a minimal level of security requirement such as an operating system or applications related thereto. In one embodiment, the first partition may be decrypted using a first key that is available as an identifier of a wireless LAN transmitter (e.g., a wireless access point) located in a building. A second partition of the encrypted white-list 240 may have executable programs 260 with a higher-level of security, such as a word processing application (e.g., Microsoft Office tools), or a company's VPN (Virtual Private Network) access, to name a few. In one embodiment, the identifier 310 may be used to decrypt one partition of the encrypted white-list 240. For example, if the identifier 310 is used to encrypt and decrypt the first partition of the encrypted white-list 240, operating system applications may be executed, but Microsoft Office tools and a companies VPN access may not be executed and/or accessed. In another example, the first partition of the encrypted white-list 240 is not encrypted, thereby allowing the operating system to boot in the executing device 200 regardless of whether there is an identifier 310 received at the executing device 200. In another example, if the identifier 310 is used to encrypt and decrypt the second partition of the encrypted white-list 240, but there is no identifier of the first partition of the encrypted white-list 240, then operating system applications may not be executed resulting in the executing device 200 denying access to the device entirely. In a multiple partitioned white-list, each partition may reference the type of application control device 300 used to encrypt the partition.

In one embodiment, operating system applications may be referenced in an un-encrypted white-list, e.g., the identifier 310 would not be required to start the operation system applications. In one embodiment, more than one white-list 240 may be utilized. For example, a first white-list may contain a list of operating system applications available to anyone with access to the executing device 200, a second white-list may contain Microsoft Office tools available to all employees of a company, and a third white-list may contain applications available only to managers of the company. In this example, a first identifier may be required to access the Microsoft Office tools and a second identifier may be required to access the applications available only to managers. This may apply to a partitioned white-list as well.

In one embodiment, the encrypted white-list 240 may be encrypted by all or part of a composite identifier 450, composed of a combination of the identifier 310 of the application control device 300 and an identifier 410 of a second application control device 400. For example, in one embodiment, a composite identifier 450 may be used to encrypt and decrypt the white-list 230. For example, both the identifier 310 and the identifier 410 may be received at the executing device 200 from the first and second application control devices 300 and 400 and used to form a composite identifier 450 for use in decrypting an encrypted white-list. In one embodiment, the composite identifier 450 may allow execution and/or access to all the executable programs 260 referenced in the encrypted white-list 240. In one embodiment, the composite identifier 450 may allow execution and/or access to only some of the executable programs 260 referenced in the encrypted white-list 240. For example, the composite identifier 450 may serve to decrypt certain partitions of the encrypted white-list 240, but not others.

In one embodiment, the executing device 200 may be required to be in a particular location before the encrypted white-list 240 may be decrypted. In one embodiment, the application control device 300 may be a GPS device in communication with a plurality of GPS satellites, and the identifier 310 may be GPS information received from the GPS device. In one embodiment, the identifier 310 received may be longitude and latitude data (e.g., a location, a range of locations) indicating where the executing device 200 is permitted to be while it is executing certain executables on a partition of the encrypted white-list 240 or an individual encrypted white-list 240. In another embodiment, the application control device 300 may be a mobile phone and the identifier 310 may be location information of the mobile phone, such as information related to a cellular tower used by the mobile phone. In one embodiment, a second application control device 400 may be required to decrypt the encrypted white-list 240. For example, if the executing device 200 is located in the proper location after receiving the identifier 310 (e.g., location information), the executing device 200 may additionally require the identifier 410 of the second application control device 400 to decrypt the encrypted white-list or a partition thereof.

As demonstrated in the above examples, the present disclosure may mitigate theft of data because even if the executing device 200 is stolen, without the presence of at least one of the application control devices 300/400 the executable programs 260 referenced in the encrypted white-list 240 will not execute, and in some cases, the executing device 200 may not boot at all.

The composite identifier 450 may include multiple identifiers of multiple application control devices in order to encrypt and decrypt the white-list 230 and for the executing device 200 to allow execution of authorized executables. In one embodiment, the composite identifier 450 may include at least 3 identifiers of at least 3 application control devices. In some embodiments, the composite identifier 450 may include at least 4 identifiers of at least 4 application control devices, or at least 5, or at least 6. More identifiers and application control devices may be used.

Figure 6:
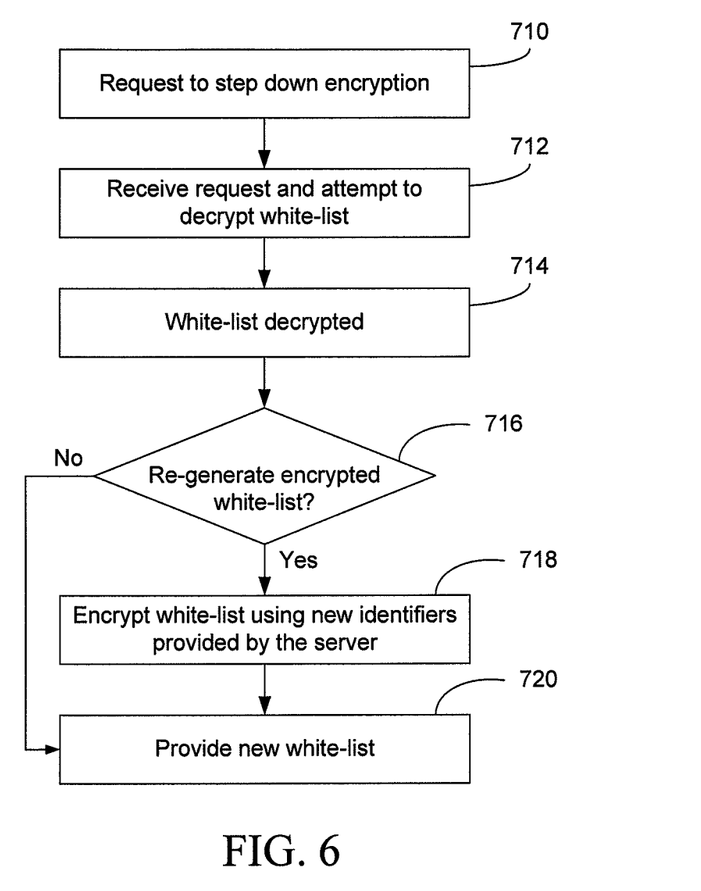
FIG. 6 is a flow chart of one embodiment of methods of managing access to an executing device including generation of an encrypted white-list.

FIG. 6 is a flow chart of one embodiment of methods of managing access to an executing device including generation of an encrypted white-list. For example, one or more white-list(s) may need to have their encryption modified (e.g., re-encrypted) or may need to be recovered, repaired, and/or replaced if the executing device loses functionality in one or more white-lists (e.g., device malfunctions, device experiences memory error). In one embodiment, the method includes requesting a reduction (e.g., a "step down") of the encryption of the encrypted white-list in step 710. For example, an administrator may request that a white-list or a partition thereof be decrypted and re-encrypted with a new identifier (e.g., an identifier of another application control device). As another example, an administrator may request that a first encrypted white-list be replaced with a second encrypted white-list. In one embodiment, an entire white-list on an executing device or a partition of the encrypted white-list may be re-encrypted, recovered, repaired, and/or replaced. In one embodiment, a white-list or partition of a white-list may be replaced with another white-list with a lower level of encryption, or with no encryption at all. For example, one partition of the encrypted white-list may be "stepped down" to a second partition of the encrypted white-list with a lower level of encryption. In one embodiment, the white-list may be "stepped down" to a lower level of encryption through receiving the request in step 712 and attempt to decrypt the white-list in step 714. In step 718, the encrypted white-list may be re-created via encrypting the white-list. For example, the white-list may be re-encrypted with a new identifier. As described further herein, the white-list may be encrypted using a new identifier provided by a server. In step 716, the white-list may be left decrypted. For example, an administrator may determine that a white-list or a partition thereof should not be encrypted. After the white-list is encrypted in step 718 or if the white-list is determined in step 716 not to be re-encrypted, the new white-list with modified encryption (or lack of encryption) is provided in step 720. For example, a server may receive the white-list for distribution, such as to an executing device.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method comprising:
   (a) storing, on a first computerized device, at least an unencrypted first white-list and an encrypted second white-list;
   (b) receiving at the first computerized device, and from a second device, all or part of a unique identifier of the second device;

wherein the unique identifier of the second device is in the form of an electromagnetic radiation signal; and
wherein the electromagnetic radiation signal has a signal strength;
(c) determining, by the first computerized device, whether the signal strength is above a predetermined threshold;
(d) when the signal strength is above the predetermined threshold, decrypting at the first computerized device the encrypted second white-list using all or part of the unique identifier of the second device, thereby creating a decrypted second white-list;
(e) determining by the first computerized device whether an executable program is referenced in the decrypted second white-list;
(f) based on the determining step (e), allowing or disallowing execution by the first computerized device of the executable program;
(g) receiving at the first computerized device an indication that the signal strength is no longer above the predetermined threshold; and
(h) in response to the receiving the indication step (g), deleting the decrypted second white-list from a cache of the first computerized device.

2. The method of claim 1, wherein the first computerized device and the second device have access to a network, the method further comprising:
transmitting a request onto the network, and performing the receiving step (h) in response to the transmitting step.

3. The method of claim 2, wherein the request is an address resolution protocol.

4. The method of claim 1, comprising:
disallowing, prior to the receiving step (b), execution of the executable program on the first computerized device.

5. The method of claim 1, comprising:
creating an unencrypted second white-list;
receiving all or part of the unique identifier of the second device;
encrypting the =encrypted second white-list via all or part of the unique identifier of the second device, thereby creating the encrypted second white-list.

6. The method of claim 1, comprising:
transmitting, prior to the receiving step (b), the unique identifier of the second device to the first computerized device.

7. The method of claim 1, wherein the unique identifier of the second device is derived from a biometric reader.

8. The method of claim 1:
wherein a partitioned white-list comprises the unencrypted first white-list and the encrypted second white-lists;
wherein the partitioned white-list is partitioned into at least a first partition and a second partition;
wherein the first partition comprises the unencrypted first white-list; and
wherein the second partition comprises the encrypted second white-list.

9. A system comprising:
(a) a first computerized device adapted to store at least an unencrypted first white-list and an encrypted second white-list;
(b) a second device adapted to transmit a unique identifier of the second device in the form of an electromagnetic radiation signal having signal strength;
wherein the first computerized device is adapted to:
(i) receive all or part of the unique identifier of the second device and,
(ii) when the signal strength is above a predetermined threshold, decrypt the encrypted second white-list into a decrypted second white-list using all or part of the unique identifier of the second device;
wherein the first computerized device is adapted to determine whether an executable program is referenced in the decrypted second white-list and based thereon, allow or disallow execution of the executable program;
wherein the first computerized device is adapted to delete the decrypted second white-list from a cache of the first computerized device when the signal strength is no longer, above the predetermined threshold.

10. The system of claim 9, wherein the first computerized device comprises a partitioned white-list;
wherein the partitioned white-list comprises:
(i) a first partition, wherein the first partition comprises the unencrypted first white-list; and
(ii) a second partition, wherein the second partition comprises the encrypted second white-list.

11. The system of claim 9, comprising:
a third device adapted to transmit a unique identifier of the third device; and
wherein the first computerized device is adapted to receive all or part of the unique identifier of the third device and decrypt the encrypted second white-list using a composite identifier comprising all or part of the unique identifier of the second device and all or part of the unique identifier of the third device.

12. The system of claim 9, wherein the first computerized device and the second device are both mobile devices.

13. The system of claim 9, wherein the executable program is a second executable program,
Wherein a first executable program is referenced in the unencrypted first white-list;
wherein the second executable program is referenced in the encrypted second white-list.

14. The system of claim 11, wherein the third device is a mobile device.

15. The method of claim 1, wherein the first computerized device and the second device are both mobile devices.

16. The method of claim 1, wherein the unique identifier of the second device comprises RFID.

17. The system of claim 9, wherein the unique identifier of the second device comprises RFID.

* * * * *